Jan. 21, 1941. H. A. KNOX 2,229,094
SYNCHRONIZING CLUTCH
Filed May 2, 1940 2 Sheets-Sheet 1
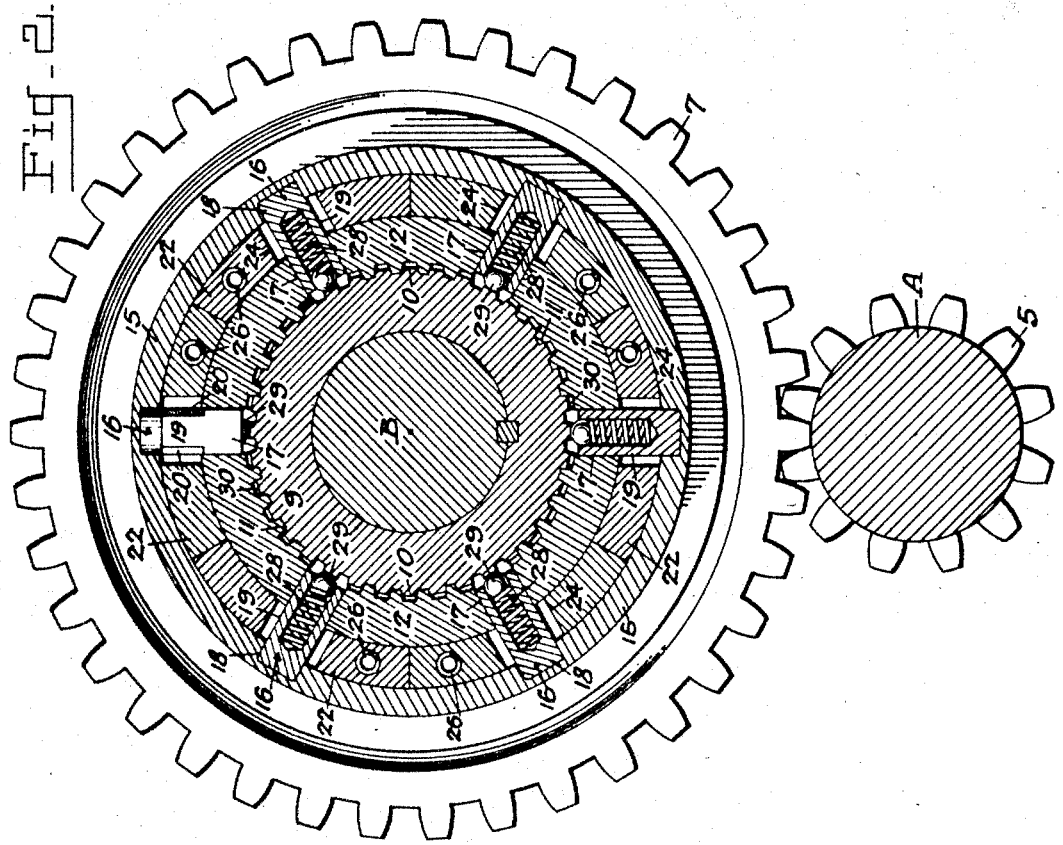
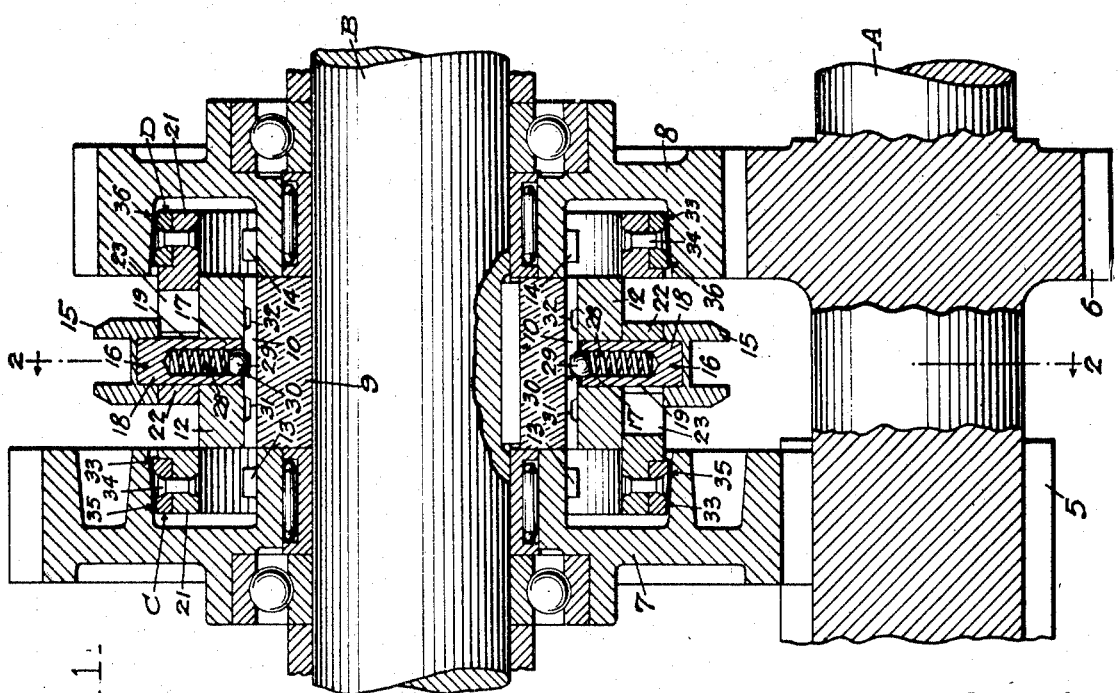
Inventor
Harry A. Knox
By G. J. Kessenich & J. H. Church
Attorneys

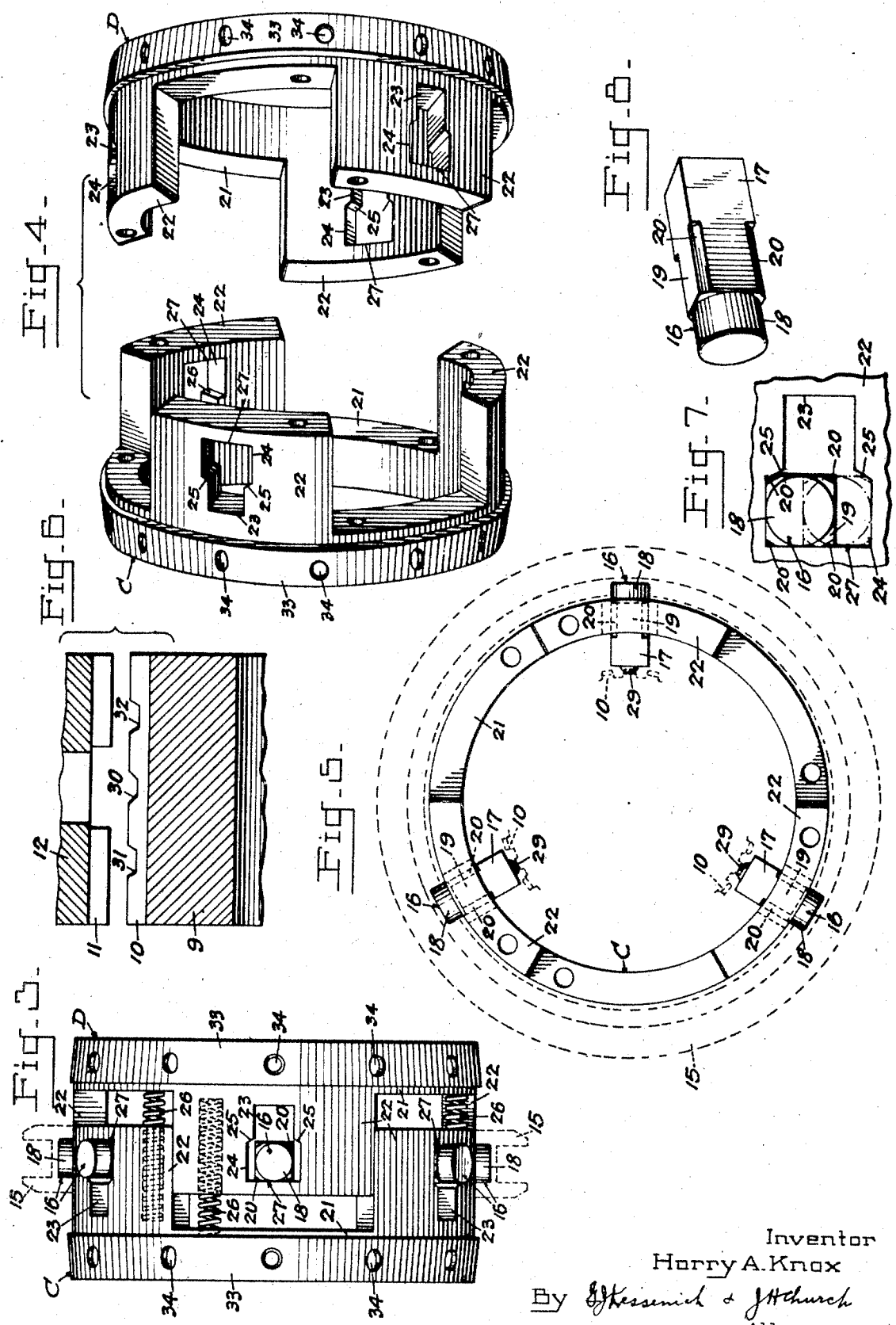

Patented Jan. 21, 1941

2,229,094

UNITED STATES PATENT OFFICE 2,229,094

SYNCHRONIZING CLUTCH

Harry A. Knox, Washington, D. C.

Application May 2, 1940, Serial No. 332,992

9 Claims. (Cl. 192—53)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a synchronizing clutch for change speed transmission gearings and is an improvement on the type shown in U. S. Patent No. 2,131,199 in which a stud arranged in an elongated slot is adapted to move a single friction clutch member in opposite directions.

The purpose of the invention is to facilitate and improve the engagement and disengagement of friction clutch members by providing slots in each of a pair of friction clutch members and by including resilient means which normally tend to separate the pair of clutch members.

The specific nature of the invention as well as other objects and advantages thereof will clearly appear from a description of a preferred embodiment as shown in the accompanying drawings in which:

Fig. 1 is a longitudinal sectional view of the improved clutch;

Fig. 2 is a sectional view on the line 2—2 of Fig. 1;

Fig. 3 is a view in elevation of the assembled clutch members;

Fig. 4 is a perspective view of the clutch members separated;

Fig. 5 is a view in elevation of one of the clutch members;

Fig. 6 is a fragmentary sectional view of the elements of the positive clutch;

Fig. 7 is an enlarged plan view of one of the slots;

Fig. 8 is a perspective view of a stud.

Referring to the drawings by characters of reference there is shown a drive shaft A having fixed gears 5 and 6 and a driven shaft B carrying free gears 7 and 8 which mesh respectively with the gears 5 and 6. An inner sleeve 9 keyed to the driven shaft and disposed between the gears 7 and 8 is formed externally with splines 10 which mesh with splines 11 formed internally in a sliding positive clutch member or outer sleeve 12. The splines 11 constitute clutch teeth which are adapted, on axial movement of the outer sleeve, to selectively engage clutch teeth 13 on the free gear 7 and clutch teeth 14 on the free gear 8.

A shifting ring 15 spaced from the outer sleeve 12 is connected thereto by means of a plurality of equi-distantly spaced studs 16, six being shown. The studs are identical and each one comprises a square inner end 17 fitting in a correspondingly shaped socket in the outer sleeve, a cylindrical outer end 18 fitting in a correspondingly shaped socket in the ring 15, and an intermediate portion 19 which is disposed in the space between the outer sleeve 12 and ring 15 and is squared with beveled corners 20.

A synchronizing clutch comprises two identical parts C and D each consisting of a ring 21 having a plurality of spaced axially extending fingers 22. The fingers of the two parts are arranged to be complementally overlapping and interengaging and mutually supporting when the parts are brought together as seen in Fig. 3. Each finger is formed with an elongated slot for receiving the intermediate portion 19 of the stud and it includes an outer portion 23 having a peripheral width to accommodate the stud and an inner portion 24 of greater width to allow relative peripheral movement of the stud and the clutch parts C or D. The shoulders 25—25 between the inner and outer portions of the slot are beveled complementally to the beveled corners 20 of the stud and are slightly spaced therefrom.

The clutch parts C and D are dimensioned to be slidably fitted and supported between the shifting ring 15 and the outer sleeve 12 and they are maintained in assembled relation by means of the studs.

Referring to Fig. 3, in the normal assembled relation the clutch parts C and D are held slightly separated by means of helical springs 26 partially housed in the fingers 22 and engaging the opposite clutch part and the separation or extension is limited by the engagement of the studs with the ends 27 of each slot.

The inner end of each stud 16 is provided with a recess for housing a helical spring 28 and a ball 29 which constitutes a coupling means adapted to be urged into engagement with the inner sleeve 9 and to enter a center groove 30, a left groove 31 or a right groove 32 formed in the splines 10 of the sleeve.

The ring 21 of the clutch parts C and D is provided with a conical friction face 33 secured by rivets 34. The faces 33 of the parts C and D are adapted to selectively engage a conical face 35 on the gear 7 and a conical face 36 on the gear 8. The angle of the conical faces is approximately four degrees.

The clutch parts C and D are shown in the neutral position in Fig. 1, being held by engagement of the balls 29 in the center groove 30. In this position there is a slight clearance between the conical friction faces 33—33 and 35 and 36. With the drive shaft A in motion the gears 5 and 6 drive the gears 7 and 8 which are free on the shaft B. When it is desired to transmit the drive for example from gear 7 to shaft B the shifting ring 15 is moved to the left and because of the connection through the studs the outer sleeve 12 will also be moved in that direction, the ball being cammed out of the center groove.

With the parts in the position shown in Fig. 3 the studs 16 in the clutch C will be free to move into the outer portion 23 of the elongated slot but the studs in the clutch D will act on the ends 27 to move clutch D to the left and this in turn will act through the springs 26 to move clutch C to the left to bring its face 33 into frictional driving engagement with the face 35. However, under normal operating conditions, the stud will be at one end of the wider portion 24 of the slot so that one of its beveled corners 20 will engage the corresponding shoulder 25 after taking up the slight clearance. The clutch C will be engaged by direct pressure of the springs 26 after which the studs will engage the shoulders 25 and then ride past them.

It will be noted from Fig. 1 that the shifting ring 15 must be moved an appreciable distance to move the outer sleeve 12 a sufficient amount to bring its splines 11 into mesh with the clutch teeth 13 on gear 7. During this additional movement the studs in clutch D will drag this member to the left increasing the spring pressure on the engaged clutch C. When the splines 11 and teeth 13 are engaged the balls 29 will be engaged in the left groove 31.

When the shifting ring is now moved to the right into neutral position the studs 16 partake of this movement and clutch D under the action of the springs 26 will follow along while clutch C under the influence of spring 26 will remain engaged with the conical face 35 of gear 7. However immediately preceding the arrival in neutral position the studs in clutch C will strike the ends 27 of their openings and positively move clutch C out of engagement with the conical face 35.

The positive release of the clutches C and D permits the employment of a relatively small angle of the conical faces and gives better and quicker synchronizing action. In large gears with narrow bearings the use of helical gears tends to incline the gear. The engagement of the small angle surfaces when maintained by spring pressure avoids objectionable angle pressure and insures stability of the gear mountings.

I claim:

1. In a double synchronizing clutch operable in opposite directions from neutral, an inner sleeve having external splines, said sleeve having a central peripheral groove and a groove at opposite sides thereof, a slidable outer sleeve having internal splines mating with the splines of the inner sleeve, a pair of friction clutch members slidable on the outer sleeve and having complementally interengaging fingers each with a slot, a plurality of studs carried by the outer sleeve, each stud passing through and slidable within a slot of a finger, a shifting ring carried by the studs, springs normally tending to separate the clutch members within the limit imposed by the studs, and a coupling means in each stud movable into the grooves of the inner sleeve.

2. In a double synchronizing clutch operable in opposite directions from neutral, an inner sleeve, a slidable outer sleeve splined on the inner sleeve, a pair of friction clutch members slidable on the outer sleeve and having complementally interengaging fingers each with a slot, a plurality of studs carried by the outer sleeve, each stud passing through and slidable within a slot of a finger, a shifting ring carried by the studs, springs normally tending to separate the clutch members within the limit imposed by the studs, and a coupling means in each stud engaging the inner sleeve.

3. In a double synchronizing clutch operable in opposite directions from neutral, an inner sleeve, a slidable outer sleeve splined on the inner sleeve, a pair of friction clutch members slidable on the outer sleeve and having complementally interengaging fingers each with a slot, a plurality of studs carried by the outer sleeve, each stud passing through and slidable within a slot of a finger, a shifting ring carried by the studs, springs normally tending to separate the clutch members within the limit imposed by the studs.

4. In a double synchronizing clutch operable in opposite directions from neutral, an inner sleeve, a slidable outer sleeve splined on the inner sleeve, a pair of friction clutch members slidable on the outer sleeve and having complementally interengaging fingers, said clutch members each provided with slots, studs carried by the outer sleeve, each stud passing through and slidable in a slot, a shifting ring carried by the studs, and springs normally tending to separate the clutch members within the limit imposed by the studs.

5. In a double synchronizing clutch operable in opposite directions from neutral, an inner sleeve, a slidable outer sleeve splined on the inner sleeve, a pair of friction clutch members slidable on the outer sleeve and having overlapping parts each with a slot, studs carried by the outer sleeve, each stud passing through and slidable within a slot, a shifting ring carried by the studs, and resilient means normally tending to separate the clutch members within the limit imposed by the studs.

6. In a double synchronizing clutch operable in opposite directions from neutral, a sliding positive clutch member, a pair of friction clutch members slidable on the positive clutch member and having slots, studs carried by the positive clutch member and limiting relative movement thereon of the friction clutch members, resilient means normally tending to separate the friction clutch members within the limit imposed by the studs, and means for shifting the studs.

7. In a double synchronizing clutch, a positive clutch member movable in opposite directions from a neutral position, a pair of similarly movable friction clutch members, connections between the positive clutch member and each of the friction clutch members for moving said friction clutch members in opposite directions, resilient means between the friction clutch members and normally urging them apart within a limit imposed by said connections, and means for releasably holding the positive clutch member in positions of adjustment.

8. In a double synchronizing clutch, a positive clutch member movable in opposite directions from a neutral position, a pair of similarly movable friction clutch members, connections between the positive clutch member and each of the friction clutch members for moving said friction clutch members in opposite directions, resilient means between the friction clutch members and normally urging them apart within a limit imposed by said connections.

9. In a double synchronizing clutch, a pair of friction clutch members movable in opposite directions from a neutral position, each member provided with slots widened at their inner ends, studs each passing through said slots, a shifting collar on the studs, and resilient means normally tending to separate the clutch members with the studs in engagement therewith at the inner ends of the slots.

HARRY A. KNOX.